United States Patent
Lee

(10) Patent No.: US 10,331,534 B2
(45) Date of Patent: Jun. 25, 2019

(54) ELECTRONIC DEVICE AND OPERATING METHOD THEREOF

(71) Applicant: Samsung Electronics Co., Ltd., Gyeonggi-do (KR)

(72) Inventor: Won-Wook Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/674,672

(22) Filed: Aug. 11, 2017

(65) Prior Publication Data

US 2018/0046832 A1 Feb. 15, 2018

(30) Foreign Application Priority Data

Aug. 12, 2016 (KR) .................. 10-2016-0103268

(51) Int. Cl.
| | | |
|---|---|---|
| G06F 3/06 | (2006.01) | |
| G06K 7/00 | (2006.01) | |
| G06F 11/30 | (2006.01) | |
| H01R 13/629 | (2006.01) | |

(52) U.S. Cl.
CPC ........ G06F 11/3051 (2013.01); G06F 3/0632 (2013.01); G06K 7/0056 (2013.01); H01R 13/629 (2013.01)

(58) Field of Classification Search
CPC .... G06F 3/0601; G06F 3/0602; G06F 3/0628; G06F 3/0629; G06F 13/1694;

(Continued)

(56) References Cited

U.S. PATENT DOCUMENTS

| | | | | |
|---|---|---|---|---|
| 6,141,563 A | * | 10/2000 | Miller .................. | H04W 88/02 379/357.01 |
| 8,478,340 B1 | * | 7/2013 | Deloatch .............. | G06K 7/0021 455/411 |
| 9,336,462 B2 | * | 5/2016 | Zhang .................. | H04B 1/3816 |
| 2001/0016502 A1 | * | 8/2001 | Shirai .................. | H04B 1/3816 455/558 |

(Continued)

FOREIGN PATENT DOCUMENTS

KR 10-2005-0089577 A 9/2005

*Primary Examiner* — Thomas J Cleary
(74) *Attorney, Agent, or Firm* — Cha & Reiter, LLC.

(57) ABSTRACT

An electronic device and method are disclosed herein. The electronic device may include a housing, a socket disposed in the housing, a tray insertable into the socket, and into which at least one of a storage medium card and a subscriber identity module (SIM) card is insertable, a communication circuit disposed in the housing, a processor disposed in the housing and electrically coupled to the communication circuit and a memory electrically coupled to the processor. And the memory may store instructions executable by the processor to cause the processor to perform a communication through the communication circuit by using a first SIM card inserted in the tray, while the tray is inserted into the socket, in response to detecting removal of the tray from the socket, deactivate at least part of the communication circuit, in response to detecting re-insertion of the tray into the socket, detecting whether a particular SIM card inserted into the re-inserted tray matches the first SIM card and determine whether to perform initialization of the communication circuit based at least partially on whether the particular SIM card matches the first SIM card.

14 Claims, 8 Drawing Sheets

(58) Field of Classification Search
CPC .............. G06F 13/385; G06F 13/4068; G06F
13/4081; G06F 1/32; G06F 1/3203; G06F
1/3206; G06F 1/3225; G06F 1/3231;
G06F 1/325; G06F 1/3275; G06F 1/3278;
G06F 1/3287; G06F 11/3034; G06F
11/3037; G06F 11/3041; G06F 11/3051;
G06F 11/3055; G06F 3/0634; G06F
3/0632; G06K 7/0056; G06K 7/0069;
G06K 7/0086; H01R 13/629
See application file for complete search history.

(56) References Cited

U.S. PATENT DOCUMENTS

| | | | |
|---|---|---|---|
| 2004/0166839 A1* | 8/2004 | Okkonen | G06F 8/65 455/419 |
| 2009/0163245 A1* | 6/2009 | Oozeki | H04M 1/675 455/558 |
| 2009/0312055 A1* | 12/2009 | Liu | H04B 1/3805 455/558 |
| 2011/0086670 A1* | 4/2011 | Shin | H04W 8/205 455/558 |
| 2012/0225669 A1* | 9/2012 | Brandt | H04H 20/61 455/456.1 |
| 2015/0079847 A1* | 3/2015 | Liu | H01R 12/721 439/630 |
| 2015/0282060 A1* | 10/2015 | Huang-Fu | H04W 8/205 455/435.2 |
| 2017/0208537 A1* | 7/2017 | Cao | H04W 24/02 |
| 2018/0220293 A1* | 8/2018 | Huang | H04W 8/22 |

\* cited by examiner

US 10,331,534 B2

ELECTRONIC DEVICE AND OPERATING METHOD THEREOF

CLAIM OF PRIORITY

This application claims the priority under 35 U.S.C. § 119(a) to Korean Application Serial No. 10-2016-0103268, which was filed in the Korean Intellectual Property Office on Aug. 12, 2016, the entire content of which is hereby incorporated by reference.

TECHNICAL FIELD

The present disclosure relates to an electronic device and an operating method thereof. More specifically, the present disclosure relates to an electronic device that includes a tray configured such that at least one of a subscriber identification module (SIM) card and a storage medium card is received therein, and to an operating method thereof.

BACKGROUND

Various electronic devices, such as smart phones, tablet PCs, and the like, support wireless communication functions over networks. Such electronic devices that support wireless communication functions enable users to perform wireless communication while moving.

A subscriber identification module or 'SIM' card may be used in an electronic device that supports a wireless communication function. The SIM card is an integrated circuit (IC) card mounted in an electronic device that supports a wireless communication function, providing the subscriber identification module used to identify and authenticate a user. Since the SIM card stores user information, the SIM card may be variously mounted in a number of electronic devices supporting a wireless communication functions, rather than solely in the user's electronic device, allowing performance of a wireless communication function in a number of devices based on the user information.

Furthermore, since an electronic device that supports a wireless communication function tends to be smaller and lighter in order to increase portability, it may be difficult to ensure there is sufficient storage space in the electronic device. In order to solve this problem, a storage medium card that can be mounted in the electronic device to supplement the insufficient storage space of the electronic device.

SUMMARY

A SIM card and a storage medium card may be inserted into a socket of an electronic device through a single tray or separate trays. In the case where the SIM card and the storage medium card are inserted into the socket of the electronic device through a single tray, the electronic device may reboot every time the tray is separated from the socket, even if the SIM card is not replaced. Furthermore, since the electronic device does not know whether the tray is separated from the socket in order to mount (or replace) the SIM card or the storage medium card, the electronic device often reboots every time the tray is separated from the socket, causing inconvenience to users.

Various embodiments of the present disclosure may provide an electronic device and an operating method thereof for solving the aforementioned problems or other problems.

According to various embodiments of the present disclosure, an electronic device may include a housing, a socket disposed in the housing, a tray insertable into the socket, and into which at least one of a storage medium card and a subscriber identity module (SIM) card is insertable, a communication circuit disposed in the housing, a processor disposed in the housing and electrically coupled to the communication circuit and a memory electrically coupled to the processor. And the memory may store instructions executable by the processor to cause the processor to perform a communication through the communication circuit by using a first SIM card inserted in the tray, while the tray is inserted into the socket, in response to detecting removal of the tray from the socket, deactivate at least part of the communication circuit, in response to detecting re-insertion of the tray into the socket, detecting whether a particular SIM card inserted into the re-inserted tray matches the first SIM card and determine whether to perform initialization of the communication circuit based at least partially on whether the particular SIM card matches the first SIM card.

According to various embodiments of the present disclosure, a method in an electronic device is disclosed, comprises performing a communication through a communication circuit of the electronic device by using a first SIM card inserted in a tray, while the tray is inserted into a socket of the electronic device, in response to detecting removal of a tray from the socket, deactivating at least part of the communication circuit, in response to detecting re-insertion of the tray into the socket, detecting, by a processor of the electronic device, whether a particular SIM card inserted into the re-inserted tray matches the first SIM card and determining whether to perform initialization of the communication circuit based at least partially on whether the particular SIM card matches the first SIM card.

According to various embodiments of the present disclosure, even if the tray is separated from the electronic device, the electronic device may not reboot based on whether or not the SIM card has been substituted, or based on the user's identified intention. Accordingly, it is possible to solve the problem in which the electronic device reboots every time the tray is separated from the electronic device.

BRIEF DESCRIPTION OF THE DRAWINGS

The above and other aspects and features of the present disclosure will be more apparent from the following detailed description taken in conjunction with the accompanying drawings, in which.

DETAILED DESCRIPTION

Figure 1:
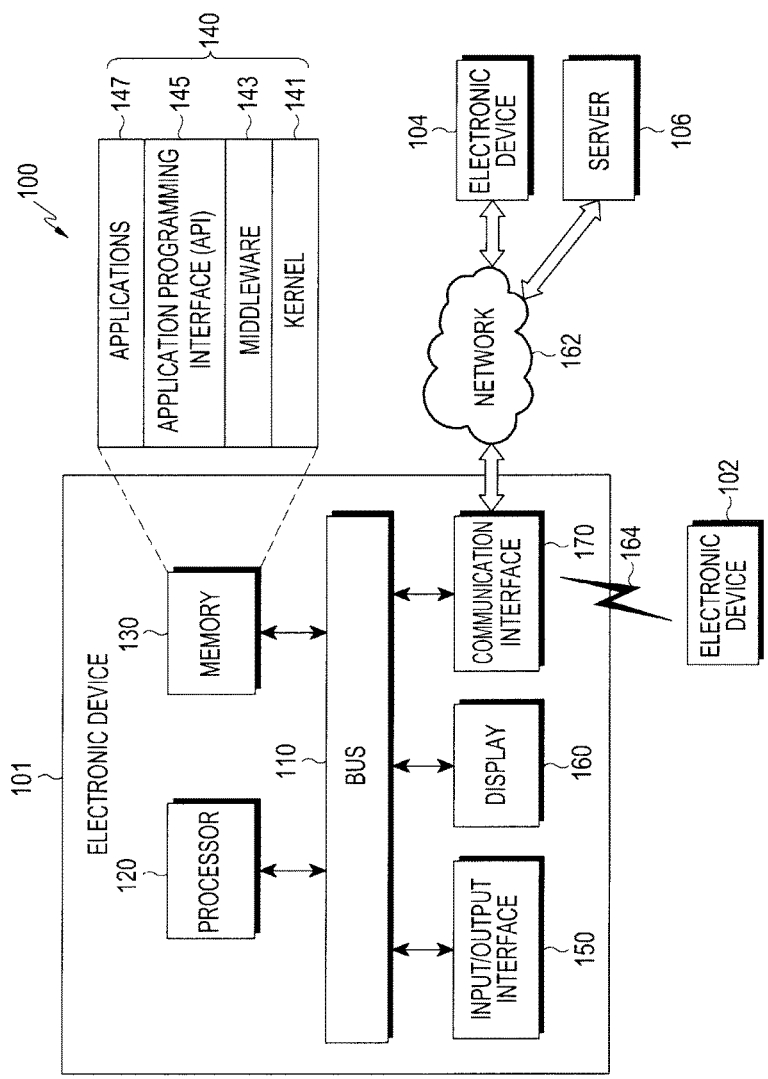
FIG. 1 illustrates a network environment including an electronic device according to various embodiments of the present disclosure.

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In the description of the drawings, similar reference numerals may be used to designate similar elements. A singular expression may include a plural expression unless they are definitely different in a context. As used herein, singular forms may include plural forms as well unless the context clearly indicates otherwise. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyrocompass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to one embodiment of the present disclosure is not limited to the above described devices. In the present disclosure, the term "user" may indicate a person using an electronic device or a device (e.g., an artificial intelligence electronic device) using an electronic device.

An electronic device 101 within a network environment 100 according to various embodiments will be described with reference to FIG. 1. The electronic device 101 may include a bus 110, a processor 120, a memory 130, an input/output interface 150, a display 160, and a communication interface (or circuit) 170. In some embodiments, the electronic device 101 may omit at least one of the elements, or may further include other elements. The bus 110 may include a circuit that interconnects the elements 110 to 170 and transmits communication (for example, control messages and/or data) between the elements. The processor 120 may include one or more of a central processing unit, an application processor, and a communication processor (CP). For example, the processor 120 may perform operations or data processing relating to the control and/or communication of at least one other element of the electronic device 101.

The memory 130 may include at least one of volatile and non-volatile memory. The memory 130 may store, for example, instructions or data relevant to at least one other element of the electronic device 101. According to one embodiment, the memory 130 may store software and/or a program 140. The program 140 may include, for example, a kernel 141, middleware 143, an application programming interface (API) 145, and/or application programs (or "applications") 147. At least some of the kernel 141, the middleware 143, and the API 145 may be referred to as an operating system. For example, the kernel 141 may control or manage system resources (for example, the bus 110, the processor 120, the memory 130, etc.) that are used for executing operations or functions implemented by other programs (for example, the middleware 143, the API 145, and the application programs 147). Furthermore, the kernel 141 may provide an interface by which the middleware 143, the API 145, or the application programs 147 may access the individual elements of the electronic device 101 to control or manage the system resources.

The middleware 143 may function as, for example, an intermediary that allows the API 145 or the application programs 147 to communicate with the kernel 141 to exchange data. Furthermore, the middleware 143 may process one or more task requests received from the application programs 147 according to priorities thereof. For example, the middleware 143 may assign, to one or more of the application programs 147, priorities for using the system resources (for example, the bus 110, the processor 120, the memory 130, etc.) of the electronic device 101, and may process the one or more task requests. The API 145 is an interface used by the applications 147 to control functions provided by the kernel 141 or the middleware 143, and may include, for example, at least one interface or function (for example, an instruction) for file control, window control, image processing, text control, etc. For example, the input/output interface 150 may forward, to the other element(s) of the electronic device 101, instructions or data input from a user or an external device, or may output, to the user or the external device, instructions or data received from the other element(s) of the electronic device 101.

The display 160 may include, for example, a liquid crystal display (LCD), a light-emitting diode (LED) display, an organic light-emitting diode (OLED) display, a micro electro mechanical system (MEMS) display, or an electronic paper display. The display 160 may display, for example, various types of content (for example, text, images, videos, icons, symbols, and/or the like) for a user. The display 160 may include a touch screen, and may receive, for example, a touch, gesture, proximity, or hovering input using an electronic pen or a part of a user's body. The communication interface 170 may configure, for example, communication between the electronic device 101 and an external device (for example, a first external electronic device 102 via connection 164, a second external electronic device 104, or a server 106). For example, the communication interface 170 may be connected to a network 162 through wireless or wired communication to communicate with the external device (for example, the second external electronic device 104 or the server 106).

The wireless communication may include, for example, at least one of LTE, LTE-Advanced (LTE-A), code division multiple access (CDMA), wideband CDMA (WCDMA), universal mobile telecommunications system (UMTS), wireless broadband (WiBro), global system for mobile communications (GSM), etc. According to one embodiment, the wireless communication may include, for example, at least one of Wi-Fi, Bluetooth, Bluetooth low energy (BLE), ZigBee, near field communication (NFC), magnetic secure transmission, radio frequency (RF), and body area network (BAN). According to one embodiment, the wired communication may include GNSS. The GNSS may be, for example, a global positioning system (GPS), a global navigation satellite system (Glonass), a Beidou navigation satellite system (hereinafter, referred to as "Beidou"), or Galileo (the European global satellite-based navigation system). Hereinafter, the term "GPS" may be interchangeable with the term "GNSS" in this document. The wired communication may include, for example, at least one of a universal serial bus (USB), a high definition multimedia interface (HDMI), recommended standard 232 (RS-232), a plain old telephone service (POTS), etc. The network 162 may include a telecommunication network, which may be, for example, at least one of a computer network (for example, a LAN or a WAN), the Internet, and a telephone network.

Each of the first and second external electronic devices 102 and 104 may be of a type that is the same as or different from that of the electronic device 101. According to various embodiments, all or some of the operations executed in the electronic device 101 may be executed in another electronic device or a plurality of electronic devices (for example, the electronic devices 102 and 104 or the server 106). According to one embodiment, when the electronic device 101 has to perform some functions or services automatically or in response to a request, the electronic device 101 may make a request for performing at least some functions relating thereto to another electronic device (for example, the electronic device 102 or 104 or the server 106), instead of, or in addition to, performing the functions or services by itself. The other electronic device (for example, the electronic device 102 or 104 or the server 106) may execute the requested functions or the additional functions, and may transmit the execution result to the electronic device 101. The electronic device 101 may provide the received result as it is, or may additionally process the received result to provide the requested functions or services. To this end, for example, cloud computing, distributed computing, or client-server computing technology may be used.

The processor 120 may process at least some of the information acquired from the other elements (for example, at least one of the memory 130, the input/output interface 150, the communication interface 170, etc.) and may use the same in various manners. For example, the processor 120 may control at least some functions of the electronic device 101 to enable the electronic device 101 to operate in conjunction with another electronic device (for example, the electronic device 102 or 104 or the server 106). The processor 120 may be integrated into the communication interface 170. According to one embodiment, at least one configuration of the processor 120 may be included in the server 106, and at least one operation implemented in the processor 120 may be supported by the server 106.

According to one embodiment, the memory 130 may include instructions that allow the processor 120 to operate. For example, the memory 130 may include instructions that allow the processor 120 to control the other elements of the electronic device 101 and to operate in conjunction with the other electronic device 102 or 104 or the server 106. On the basis of the instructions stored in the memory 130, the processor 120 may control the other elements of the electronic device 101 and may operate in conjunction with the other electronic device 102 or 104 or the server 106. Hereinafter, operations of the electronic device 101 will be described with the elements of the electronic device 101 as subjects. Furthermore, instructions that allow the elements to perform operations thereof may be included in the memory 130.

According to various embodiments, the elements of the electronic device 101 may be included in a housing of the electronic device 101. The electronic device 101 may include a socket in one region of the housing thereof.

According to various embodiments of the present disclosure, the electronic device 101 may include a tray into which at least one of a SIM card and a storage medium card is insertable. The tray may have a structure into which a SIM card and a storage medium card can be simultaneously inserted, and the tray may be insertable in the socket. When a SIM card and a storage medium card are inserted into the tray and the tray is inserted into the socket, the electronic device 101 may simultaneously recognize the SIM card and the storage medium card. For example, the tray may also have a structure in which two SIM cards are inserted. In this case, one of the two SIM cards may be selected by a user to perform communication, and the SIM cards may be switched according to a user selection such that the other SIM card may be used for communication. Hereinafter, the tray will be described as being configured to receive one SIM card therein. However, without being limited thereto, the tray may be configured to receive two SIM cards therein.

For example, the processor 120 may selectively use a predetermined general-purpose input/output (GIPO) or a general GPIO to recognize a SIM card or a storage medium card. For example, when there is an obstacle to GPIO allocation for recognizing a SIM card or a storage medium card, the processor 120 may recognize the SIM card or the storage medium card through a processor that is different from a GPIO expander or the processor 120.

The specific structure of the tray will be described below with reference to FIG. 4A.

According to various embodiments of the present disclosure, a SIM card may be a card-type module that stores user information used to access a network of a service provider (for example, a network operator) that has issued the SIM card. The user information may include, for example, at least one of a mobile country code (MCC), a mobile network code (MNC), and a group identifier (GID). The MCC may be used to identify a country, and the MNC may be used to identify a particular network in the country identified by the MCC. The GID may be used to identify a particular group of electronic devices having the same MCC and MNC. For example, the GID may be used to identify a group of electronic devices that the service provider has assigned to a different service provider for use in a network.

The processor 120 may identify the SIM card inserted into the tray using at least one of the MCC, the MNC, and the GID included in the user information, and when the tray is separated from the socket and then inserted therein again, the processor 120 may determine whether the same SIM card remains in the tray, using the user information.

For example, the SIM card may further include information used to provide various services, such as user authentication, accounting, security, etc. The following description will be focused on a SIM card. However, without being limited thereto, a user identification module (UIM) card or a universal subscriber identity module (USIM) card, as well as a SIM card, may be used.

According to various embodiments of the present disclosure, a storage medium card may be external memory that is inserted into the tray and the tray is inserted into the socket of the electronic device 101. The following description will be focused on the case in which a micro-SD card (for example, a T-flash card), among available types of storage medium cards, is used. However, without being limited thereto, various types of storage medium cards (for example, a general SD card, a mini-SD card, a multimedia card (MMC), etc.) may be used as the storage medium card.

According to various embodiments of the present disclosure, the electronic device 101 may include a communication circuit (for example, the communication interface 170). The communication circuit may include a communication module that performs communication through a network using user information stored in a SIM card. For example, the communication module may be a cellular module 221 illustrated in FIG. 2. For example, the communication module may include at least a part of an RF module (for example, an RF module 229) that performs communication using the user information stored in the SIM card. As described above, the communication circuit may include the communication module that performs communication using the user information stored in the SIM card, unlike other communication modules (for example, a Wi-Fi module 223, a BT module 225, a GNSS module 227, an NFC module 228, etc.) that do not use user information stored in a SIM card.

According to various embodiments of the present disclosure, the processor 120 may perform communication through the communication circuit by using a first SIM card inserted in the tray, while the tray has been inserted in the socket. The processor 120 may perform communication through the communication circuit using user information stored in the first SIM card.

According to various embodiments of the present disclosure, the processor 120 may detect whether the tray is removed from the socket. The processor 120 may deactivate at least part of the communication circuit in response to detecting removal of the tray from the socket. The processor 120 may deactivate the communication module performing communication using the user information stored in the first SIM card, among one or more communication modules included in the communication circuit.

For example, the processor 120 may change the operating mode of the electronic device 101 to an "airplane mode" set in the electronic device 101 to stop the communication using the user information stored in the SIM card. The "airplane mode" used herein may represent an operating mode of the electronic device 101 in which the electronic device 101 does not perform communication using the user information stored in the SIM card.

The processor 120 may detect whether the tray is re-inserted into the socket. Upon detecting re-insertion of the tray into the socket, the processor 120 may detect whether a particular SIM card inserted into the re-inserted tray matches the first SIM card inserted before the removal of tray is detected. For example, the processor 120 may detect whether the first SIM card or a second SIM card different from the first SIM card is present in the re-inserted tray. If the particular SIM card inserted into the re-inserted tray fails to match the first SIM card or the second SIM card is present in the re-inserted tray, the processor 120 needs to initialize the communication circuit using user information stored in the particular SIM card or the second SIM card.

According to various embodiments of the present disclosure, the processor 120 may store user information of the first SIM card before the tray is removed, and retrieve user information of the particular SIM card after the tray is re-inserted. The processor 120 may compare the stored user information of the first SIM card with the retrieved user information of the particular SIM card to detect whether the particular SIM card inserted in the re-inserted tray matches the first SIM card.

For example, the processor 120 may compare the user information of the first SIM card and the user information of the second SIM card to detect whether the first SIM card or the second SIM card is present in the re-inserted tray. For example, the processor 120 may compare at least one of the MCC, the MNC, and the GID included in the user information of the first SIM card with the corresponding information stored in the second SIM card to detect whether the first SIM card or the second SIM card is present in the re-inserted tray.

In various embodiments, the processor 120 may determine whether the particular SIM card inserted in the re-inserted tray matches the first SIM card through the network of the service provider after the tray is re-inserted in the socket. On the basis of the determination result through the network, the processor 120 may detect whether the particular SIM card inserted in the re-inserted tray matches the first SIM card.

According to various embodiments of the present disclosure, the processor 120 may determine whether to perform initialization the communication circuit, based at least partially on whether the particular SIM card matches the first SIM card. For example, after the tray is re-inserted in the socket, the processor 120 may detect whether the particular SIM card matches the first SIM card, and may determine whether to perform initialization of the communication circuit on the basis on whether the particular SIM card matches the first SIM card.

The initialization of the communication circuit may refer to an operation of removing the user information of the previous SIM card from the information representing the state of the communication circuit and setting the information representing the state of the communication circuit according to the user information of the new SIM card in order to use the new SIM card.

The processor 120 may initialize the communication circuit in response to detecting the particular SIM card fails to match the first SIM card or in response to detecting an absence of any SIM card in the re-inserted tray. For example, the processor 120 may reboot the electronic device 101 to initialize the communication circuit.

For example, in the case where the particular SIM card matches the first SIM card, the processor 120 may not initialize the communication circuit. In this case, the processor 120 may not initialize the communication circuit since the particular SIM card in the re-inserted tray matches the first SIM card inserted into the tray before the removal of the tray is detected. In the case where the processor 120 does not initialize the communication circuit, the processor 120 may activate the at least part of the deactivated communication circuit again. Since the particular SIM card in the re-inserted tray matches the first SIM card, the user information is also the same, and thus the processor 120 may perform communication by activating at least part of the deactivated communication circuit again.

In various embodiments, the processor 120 may initialize the communication circuit when the particular SIM card does not match the first SIM card inserted into the tray before the removal of the tray is detected. In this case, the processor 120 may initialize the communication circuit since the particular SIM card does not match the first SIM card. For example, even in the case where there is no SIM card in the re-inserted tray, the processor 120 may initialize the communication circuit. For example, since the processor 120 cannot identify user information of a SIM card, the processor 120 may initialize the communication circuit. In various embodiments, the processor 120 may make an emergency call possible in preparation for an emergency situation even in the case where there is no SIM card in the re-inserted tray.

In various embodiments, in the case where the tray is configured to receive two SIM cards, the processor 120 may determine whether both the SIM cards have been replaced and may determine whether to initialize the communication circuit according to the determination result in the same way as that described above after the tray has been inserted into the socket again. For example, when it is determined that at least one of the two SIM cards has been replaced, the processor 120 may initialize the communication circuit. For example, even in the case where there is no SIM card in the tray, the processor 120 may initialize the communication circuit. In various embodiments, when it is determined that neither of the two SIM cards has been replaced, the processor 120 may not initialize the communication circuit.

According to various embodiments of the present disclosure, when the tray is separated from the socket, the processor 120 may output a message requesting selection of one of the SIM card option and the storage medium card option. The message may be displayed in the form of a popup window on the display 160, or may be output in a voice through a speaker.

When the storage medium card option is selected according to user input, the processor 120 may deactivate at least part of the communication circuit. In various embodiments, when the tray is separated from the socket, and the storage medium card option is selected according to user input, the processor 120 may deactivate at least part of the communication circuit. For example, when the tray is inserted into the socket again, the processor 120 may determine whether the SIM card in the re-inserted tray has been substituted, and may determine whether to initialize the communication circuit.

In various embodiments, the processor 120 may not initialize the communication circuit when a user wants the storage medium card, rather than the SIM card, to be replaced or received. For example, in the situation in which the electronic device 101 fails to recognize the SIM card on account of separation of the tray, the electronic device 101 may deactivate at least part of the communication circuit, thereby preventing communication from being performed using the user information stored in the SIM card. The following description is focused on an operation of deactivating at least part of the communication circuit, which performs communication using the user information, when input for selecting the storage medium card option is received. However, without being limited thereto, other communication modules (for example, the Wi-Fi module 223, the BT module 225, the GNSS module 227, the NFC module 228, etc.) that do not use the user information stored in the SIM card may be deactivated, in addition to at least part of the communication circuit performing communication using the user information.

In various embodiments, when the SIM card option is selected according to user input, the processor 120 may perform at least part of the initialization of the communication circuit and may deactivate at least part of the communication module. For example, when the SIM card option is selected according to user input, the processor 120 may perform at least part of the initialization operation in advance since the processor 120 cannot identify information included in a new SIM card to be inserted. For example, the processor 120 may perform at least some executable operations of the initialization in advance irrespective of the information included in the new SIM card to be inserted. In various embodiments, the processor 120 may reduce the execution time of the communication circuit initialization that is performed when the new SIM card is inserted, by performing at least part of the communication circuit initialization.

For example, after the tray is re-inserted, the processor 120 may not determine whether the SIM card in the tray has been substituted. In various embodiments, the processor 120 may initialize the communication circuit without determining whether the SIM card in the re-inserted tray has been substituted. All inputs (such as, a touch input, a voice input, a gesture input, a key input, etc.) that can be received through various input units that the input/output interface 150 can support may be used as user input.

According to various embodiments of the present disclosure, when the tray is separated from the socket while the electronic device 101 is in a turned-off state, the electronic device 101 may be turned-on and the message may be outputted. When the tray has the storage medium card therein, or when the storage medium card in the tray is replaced, the electronic device 101 may not perform a particular operation, such as performing user authentication using the user information included in the SIM card. Accordingly, the electronic device 101 may be turned on in order to output the message.

Since the tray is configured to receive both the SIM card and the storage medium card, the electronic device 101 cannot find out whether a user has separated the tray in order to mount (or replace) the SIM card or the storage medium card. For example, since the SIM card includes user information, the user information has to be checked in order to authenticate or identify the user every time the tray is mounted. Accordingly, the communication circuit is initialized. For example, even when the user separates the tray in order to replace the storage medium card rather than the SIM card, the communication circuit is initialized, which may cause inconvenience to the user. According to various embodiments, when the separation of the tray is sensed, the processor 120 may output the message in order to prompt the user to select the SIM card option or the storage medium card option that the user wants to replace or receive.

According to various embodiments of the present disclosure, the processor 120 may deactivate at least part of the communication circuit when the tray is separated, and may initialize the communication circuit if the tray is not inserted into the socket again within a preset time. The processor 120 may set the time according to the policy of a service provider that provides a network to which the electronic device 101 is connected in order to perform communication through the communication circuit, which may help to enhance the security of handling of user information.

Figure 2:
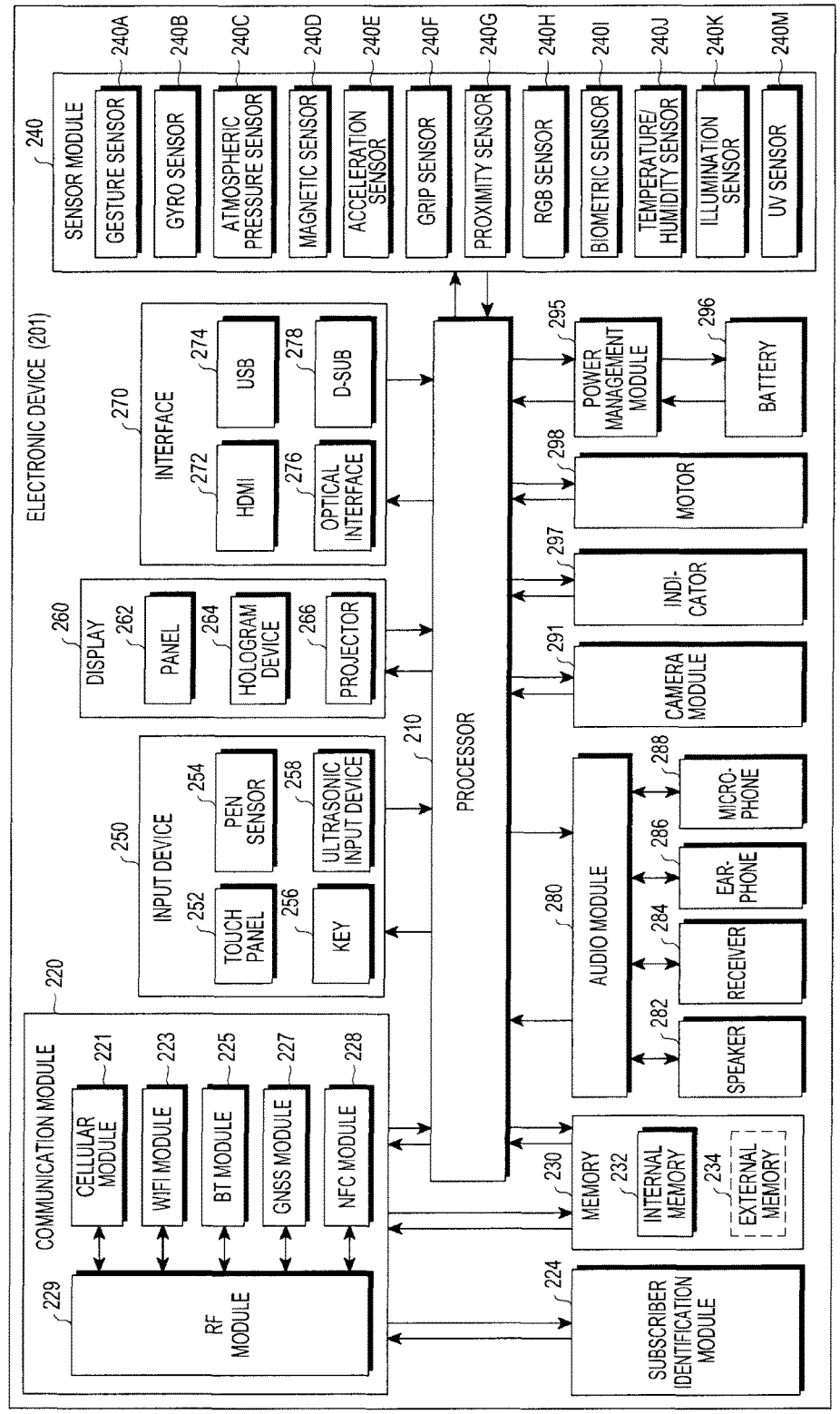
FIG. 2 is a block diagram of an electronic device according to various embodiments of the present disclosure.

FIG. 2 is a block diagram of an electronic device 201 according to various embodiments. The electronic device 201 may include, for example, all or part of the electronic device 101 illustrated in FIG. 1. The electronic device 201 may include at least one processor 210 (for example, an AP), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. The processor 210 may drive, for example, an operating system or application programs to control a plurality of hardware or software elements connected to the processor 210 and to perform various types of data processing and operations. The processor 210 may be implemented by, for example, a System on Chip (SoC). According to one embodiment, the processor 210 may further include at least one of a graphic processing unit (GPU) and an image signal processor. The processor 210 may also include at least some of the elements illustrated in FIG. 2 (for example, a cellular module 221). The processor 210 may process instructions or data that have been received from at least one of the other elements (for example, a non-volatile memory) and loaded into volatile memory, and may store resultant data in the non-volatile memory.

The communication module 220 may have the same configuration as, or a configuration similar to, that of the communication interface 170. The communication module 220 may include, for example, a cellular module 221, a Wi-Fi module 223, a Bluetooth module 225, a GNSS module 227, an NFC module 228, and an RF module 229. The cellular module 221 may provide, for example, a voice call, a video call, a text message service, an Internet service, or the like through a communication network. According to one embodiment, the cellular module 221 may identify and authenticate the electronic device 201 within a communication network using the subscriber identification module 224 (for example, a SIM card). According to one embodiment, the cellular module 221 may perform at least some of the functions that the processor 210 may provide. According to one embodiment, the cellular module 221 may include a communication processor (CP). According to some embodiments, at least some (for example, two or more) of the cellular module 221, the Wi-Fi module 223, the Bluetooth module 225, the GNSS module 227, and the NFC module 228 may be included in one integrated chip (IC) or IC package. The RF module 229 may transmit/receive, for example, a communication signal (for example, an RF signal). The RF module 229 may include, for example, a transceiver, a power amp module (PAM), a frequency filter, a low noise amplifier (LNA), an antenna, etc. According to another embodiment, at least one of the cellular module 221, the Wi-Fi module 223, the Bluetooth module 225, the GPS (i.e., GNSS) module 227, and the NFC module 228 may transmit/receive an RF signal through a separate RF module. The subscriber identification module 224 may include, for example, a card including a subscriber identification module, or an embedded SIM, and may contain unique identification information (for example, an integrated circuit card identifier (ICCID)) or subscriber information (for example, international mobile subscriber identity (IMSI)).

The memory 230 (for example, the memory 130) may include, for example, an internal memory 232 or an external memory 234. The internal memory 232 may include, for example, at least one of volatile memory (for example, a DRAM, an SRAM, an SDRAM, etc.) and non-volatile memory (for example, a one-time programmable ROM (OTPROM), a PROM, an EPROM, an EEPROM, a mask ROM, a flash ROM, a flash memory, a hard disc drive, or a solid state drive (SSD)). The external memory 234 may include a flash drive, for example, a compact flash (CF), a secure digital (SD), a Micro-SD, a Mini-SD, an eXtreme digital (xD), a multimedia card (MMC), a memory stick, etc. The external memory 234 may be functionally or physically connected to the electronic device 201 through various kinds of interfaces.

The sensor module 240 may, for example, measure a physical quantity or detect the operating state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, and blue (RGB) sensor), a biometric sensor 240I, a temperature/humidity sensor 240J, an illuminance sensor 240K, and an ultraviolet (UV) sensor 240M. Additionally or alternatively, the sensor module 240 may include, for example, at least one of an e-nose sensor, an electromyography (EMG) sensor, an electroencephalogram (EEG) sensor, an electrocardiogram (ECG) sensor, an infrared (IR) sensor, an iris sensor, and a fingerprint sensor. The sensor module 240 may further include a control circuit for controlling one or more sensors included therein. In some embodiments, the electronic device 201 may further include a processor configured to control the sensor module 240 as a part of the processor 210 or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer to provide a tactile reaction to a user. The (digital) pen sensor 254 may include, for example, a recognition sheet that is a part of, or separate from, the touch panel. The key 256 may include, for example, a physical button, an optical key, or a keypad. The ultrasonic input device 258 may sense, through a microphone (for example, a microphone 288), ultrasonic waves generated by an input tool to identify data corresponding to the sensed ultrasonic waves.

The display 260 (for example, the display 160) may include at least one of a panel 262, a hologram device 264, a projector 266, and a control circuit for controlling the panel 262, the hologram device 264, and the projector 266. The panel 262 may be implemented to be, for example, flexible, transparent, or wearable. The panel 262, together with the touch panel 252, may be configured as one or more modules. According to one embodiment, the panel 262 may include a pressure sensor (or a POS sensor) that can measure a pressure level of a user's touch. The pressure sensor may be integrated with the touch panel 252, or may be implemented as one or more sensors separate from the touch panel 252. The hologram device 264 may show a three-dimensional image in the air using light interference. The projector 266 may display an image by projecting light onto a screen. The screen may be located, for example, in the interior of, or on the exterior of, the electronic device 201. The interface 270 may include, for example, an HDMI 272, a USB 274, an optical interface 276, or a D-subminiature (D-sub) 278. The interface 270 may be included in, for example, the communication interface 170 illustrated in FIG. 1. Additionally or alternatively, the interface 270 may include, for example, a mobile high-definition link (MHL) interface, an SD card/multimedia card (MMC) interface, or an infrared data association (IrDA) standard interface.

The audio module 280 may, for example, convert sound into an electrical signal, and vice versa. At least some elements of the audio module 280 may be included in, for example, the input/output interface 150 illustrated in FIG. 1. The audio module 280 may process sound information that is input or output through, for example, a speaker 282, a receiver 284, earphones 286, the microphone 288, etc. The camera module 291 is a device that can take a still image and a moving image. According to one embodiment, the camera module 291 may include one or more image sensors (for example, a front sensor or a rear sensor), a lens, an image signal processor (ISP), or a flash (for example, an LED or xenon lamp). The power management module 295 may manage, for example, power of the electronic device 201. According to one embodiment, the power management module 295 may include a power management integrated circuit (PMIC), a charger IC, or a battery or fuel gauge. The PMIC may use a wired and/or wireless charging method. Examples of the wireless charging method may include a magnetic resonance method, a magnetic induction method, an electromagnetic wave method, etc. Additional circuits (for example, a coil loop, a resonance circuit, a rectifier, etc.) for wireless charging may be further included. The battery gauge may measure, for example, the remaining amount of a charge of the battery 296 and a voltage, current, or temperature while charging. The battery 296 may include, for example, at least one of a rechargeable battery and a solar battery.

The indicator 297 may indicate a particular state (for example, a booting state, a message state, a charging state, etc.) of the electronic device 201 or a part thereof (for example, the processor 210). The motor 298 may convert an electrical signal into a mechanical vibration and may generate a vibration, a haptic effect, etc. The electronic device 201 may include a mobile TV support device (for example, a GPU) that can process media data according to a standard, such as digital multimedia broadcasting (DMB), digital video broadcasting (DVB), mediaFlo™, etc. Each of the above-described component elements of hardware according to the present disclosure may be configured with one or more components, and the names of the corresponding component elements may vary based on the type of electronic device. In various embodiments, an electronic device (for example, the electronic device 201) may omit some elements or may further include additional elements, or some of the elements of the electronic device may be combined with each other to configure one entity, in which case the electronic device may identically perform the functions of the corresponding elements prior to the combination.

Figure 3:
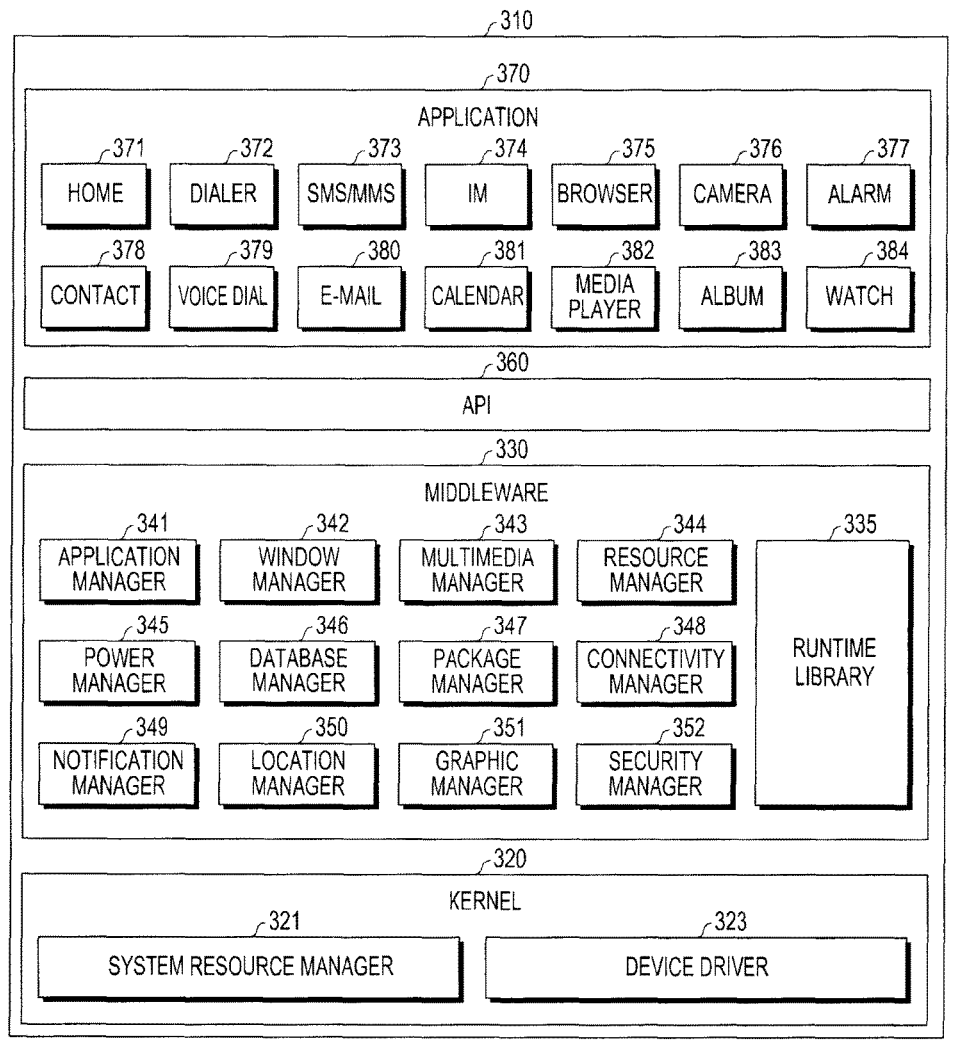
FIG. 3 is a block diagram of a program module according to various embodiments of the present disclosure.

FIG. 3 is a block diagram of a program module according to various embodiments. According to one embodiment, the program module 310 (for example, the program 140) may include an operating system that controls resources associated with an electronic device (for example, the electronic device 101), and/or various applications (for example, the application programs 147) that are driven on the operating system. Examples of the operating system may include Android™, iOS™, Windows™, Symbian™, Tizen™, and Bada™. Referring to FIG. 3, the program module 310 may include a kernel 320 (for example, the kernel 141), middleware 330 (for example, the middleware 143), an API 360 (for example, the API 145), and/or applications 370 (for example, the application programs 147). At least a part of the program module 310 may be preloaded on the electronic device, or may be downloaded from an external electronic device (for example, the electronic device 102 or 104 or the server 106).

The kernel 320 may include, for example, at least one of a system resource manager 321 and a device driver 323. The system resource manager 321 may control, allocate, or retrieve system resources. According to one embodiment, the system resource manager 321 may include a process manager, a memory manager, or a file-system manager. The device driver 323 may include, for example, a display driver, a camera driver, a Bluetooth driver, a shared-memory driver, a USB driver, a keypad driver, a Wi-Fi driver, an audio driver, or an inter-process communication (IPC) driver. The middleware 330 may provide, for example, a function utilized by the applications 370 in common, or may provide various functions to the applications 370 through the API 360 to allow the applications 370 to use the limited system resources within the electronic device. According to one embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may manage input/output, manage memory, or process an arithmetic function. The application manager 341 may manage, for example, the life cycles of the applications 370. The window manager 342 may manage GUI resources used on a screen. The multimedia manager 343 may identify formats utilized for reproducing media files and may encode or decode a media file using a codec suitable for the corresponding format. The resource manager 344 may manage source code of the applications 370 or space in memory. The power manager 345 may manage, for example, the capacity or power of a battery and may provide power information utilized for operating the electronic device. According to one embodiment, the power manager 345 may operate in conjunction with a basic input/output system (BIOS). The database manager 346 may, for example, generate, search, or change a database that is to be used by the applications 370. The package manager 347 may manage the installation or update of an application that is distributed in the form of a package file.

The connectivity manager 348 may manage, for example, wireless connection. The notification manager 349 may provide information about events (for example, an arrival message, an appointment, a proximity notification, etc.) to a user. The location manager 350 may manage, for example, the location information of the electronic device. The graphic manager 351 may manage, for example, a graphic effect to be provided to a user, or a user interface relating thereto. The security manager 352 may provide, for example, system security or user authentication. According to one embodiment, the middleware 330 may include a telephony manager for managing a voice or video call function of the electronic device, or a middleware module that can form a combination of the functions of the above-described elements. According to one embodiment, the middleware 330 may provide specialized modules according to the types of operating systems. The middleware 330 may dynamically remove some of the existing elements, or may add new elements. The API 360 is, for example, a set of API programming functions, and may have different configurations according to operating systems. For example, in the case of Android or iOS, one API set may be provided for each platform, and in the case of Tizen, two or more API sets may be provided for each platform.

The applications 370 may include, for example, a home application 371, a dialer application 372, an SMS/MMS application 373, an instant message (IM) application 374, a browser application 375, a camera application 376, an alarm application 377, a contacts application 378, a voice dial application 379, an e-mail application 380, a calendar application 381, a media player application 382, an album application 383, a watch application 384, a health care application (e.g., measuring exercise quantity or blood glucose), and an environmental information (e.g., atmospheric pressure, humidity, or temperature information) application. According to one embodiment, the applications 370 may include an information exchange application that can support the exchange of information between the electronic device and an external electronic device. The information exchange application may include, for example, a notification relay application for relaying particular information to an external electronic device or a device management application for managing an external electronic device. For example, the notification relay application may relay notification information generated in the other applications of the electronic device to an external electronic device, or may provide, to a user, notification information received from an external electronic device. The device management application may install, delete, or update a function of an external electronic device communicating with the electronic device (for example, turning on/off the external electronic device itself (or some components thereof) or adjusting the brightness (or resolution) of a display), or an application that operates in the external electronic device. According to one embodiment, the applications 370 may include applications (for example, a health care application of a mobile medical appliance) that are designated according to attributes of an external electronic device. According to one embodiment, the applications 370 may include applications received from an external electronic device. At least some of the program module 310 may be implemented (for example, executed) by software, firmware, hardware (for example, the processor 210), or a combination of two or more thereof, and may include a module, a program, a routine, an instruction set, or a process for performing one or more functions.

Figure 4A:
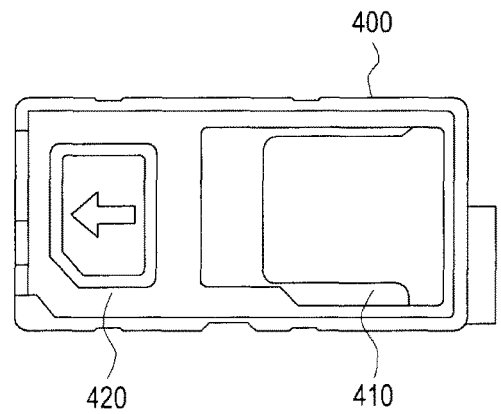
FIG. 4A illustrates a tray according to various embodiments of the present disclosure.

FIG. 4A illustrates a tray according to various embodiments of the present disclosure.

Referring to FIG. 4A, the tray 400 may include a first mounting part 420 for receiving a SIM card and a second mounting part 410 for receiving a storage medium card. The SIM card and the storage medium card may be inserted into the tray 400 together. Accordingly, the electronic device 101 may simultaneously recognize the SIM card and the storage medium card when the tray 400 is inserted into a socket of the electronic device 101. In various embodiments, although not illustrated, the tray 400 may also be configured to receive two SIM cards. In this case, one of the two SIM cards may be selected by a user to perform communication, and the SIM cards may be switched according to user selection such that the other SIM card may be used for communication.

Figure 4B:
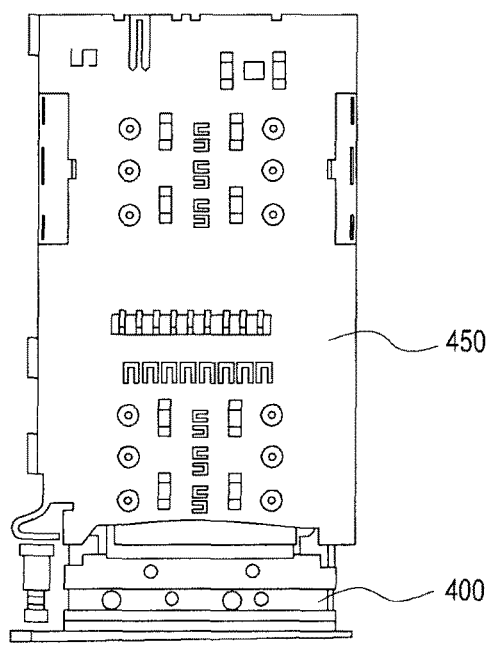
FIG. 4B illustrates a socket according to various embodiments of the present disclosure.

FIG. 4B illustrates a socket according to various embodiments of the present disclosure.

FIG. 4B illustrates the socket 450 in which the tray 400, which has been described above with reference to FIG. 4A, is inserted. When the tray 400 is inserted into the socket 450, one side of the tray 400 may be inserted into the socket 450 first. The tray 400 may be separated from the socket 450 in the opposite direction to that in which the tray 400 is inserted into the socket 450. For example, a method of separating the tray 400 from the socket 450 may include a push-pull method, a push-push method, etc.

Figure 5A:
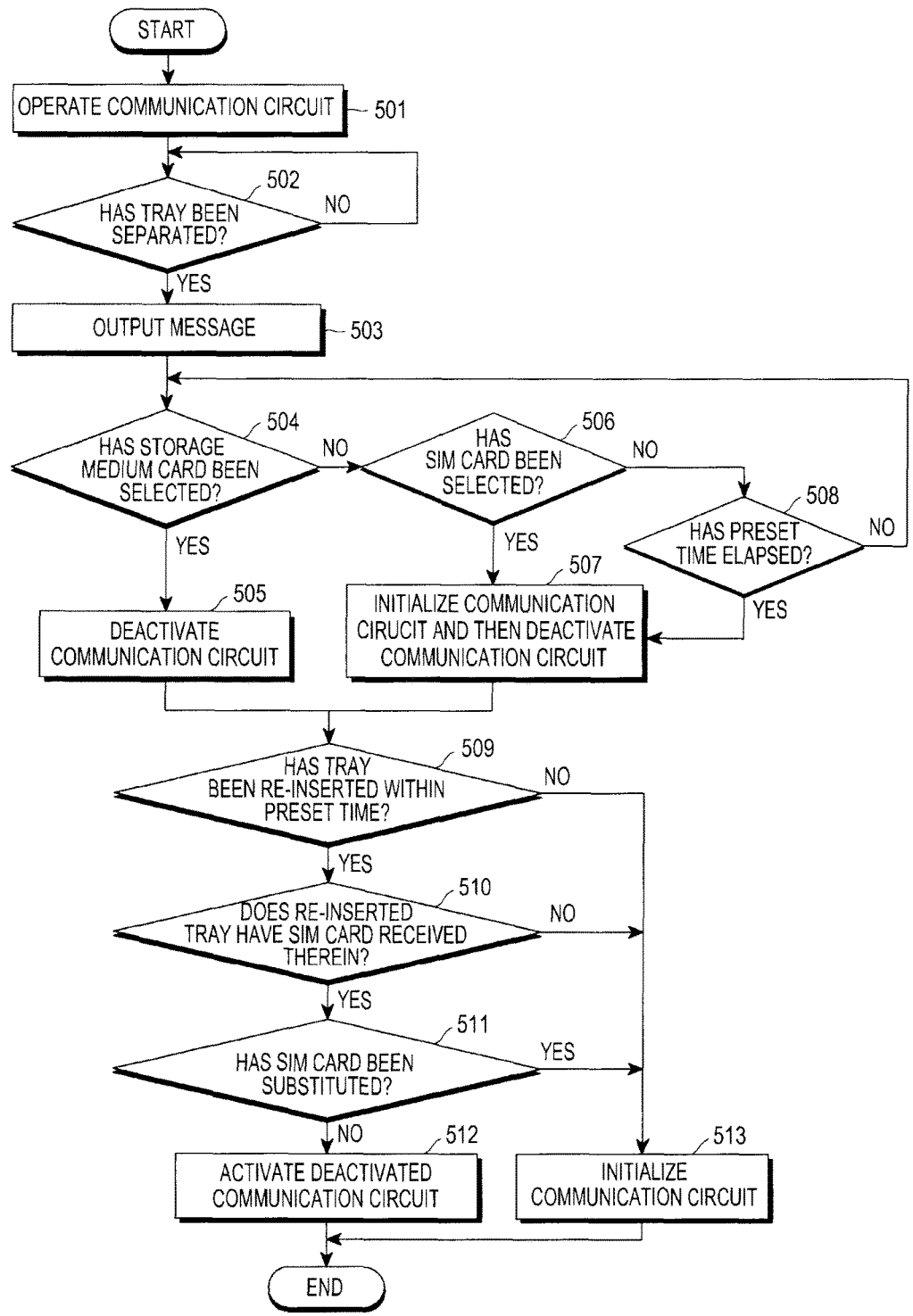
FIG. 5A and FIG. 5B are flowcharts illustrating operating methods of an electronic device according to various embodiments of the present disclosure.

FIG. 5A is a flowchart illustrating an operating method of an electronic device according to various embodiments of the present disclosure.

In operation 501, the electronic device 101 may perform communication through a communication circuit by using a first SIM card inserted into the tray while the tray is inserted into the socket of the electronic device 101. The electronic device 101 may perform communications through the communication circuit utilizing user information stored in the first SIM card.

In operation 502, the electronic device 101 may detect whether the tray is separated, removed or otherwise ejected from the socket.

Figure 6A:
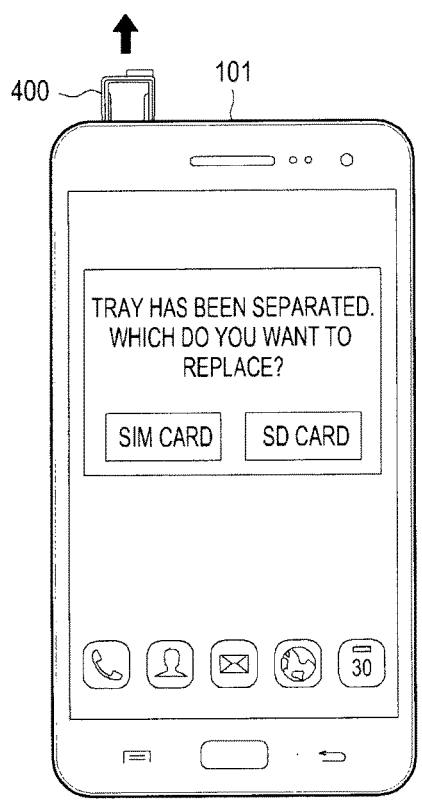
FIG. 6A and FIG. 6B are views illustrating methods of outputting a message by an electronic device according to various embodiments of the present disclosure.
Figure 6B:

In operation 503, the electronic device 101 may output a notification or message requesting selection of one of a SIM card option or a storage medium card option when the separation of the tray is detected. The message may be displayed in the form of a popup window displayed on the display 160, as illustrated in FIG. 6A, or may be output in an audial form (e.g., voice) through an audio speaker, as illustrated in FIG. 6B. Thus, when the separation of the tray is detected, the electronic device 101 may output the message in order to prompt a user to select which of the SIM card and storage medium card the user intends to replace (or receive).

In operation 504, the electronic device 101 may determine whether the storage medium card option is selected according to user input. In operation 505, the electronic device 101 may deactivate at least part of the communication circuit when the storage medium card option is selected. For example, when the user wants to replace or mount the storage medium card, rather than the SIM card, the electronic device 101 may temporarily deactivate the communication circuit of the electronic device 101. For example, when the electronic device 101 fails to recognize the SIM card because of the removal or separation of the tray, the electronic device 101 may deactivate at least part of the communication circuit, thereby preventing communications from being performed using the user information stored in the SIM card.

In operation 506, the electronic device 101 may determine whether the SIM card option is selected according to user input rather than the storage medium card option. If so, then in operation 507, the electronic device 101 may perform at least part of the initialization of the communication circuit, and deactivate at least part of the communication circuit. That is, the electronic device 101 can reduce the amount of time utilized for initialization of the communication circuit performed responsive to the replacement of the SIM card, by pre-performing at least part of the initialization of the communication circuit. The electronic device 101 may then deactivate at least part of the communication circuit, thereby preventing full initialization in which communication would be set to be performed using the user information stored in the SIM card, since the SIM card is about to be replaced.

If neither the storage medium card option nor the SIM card option are selected, then in operation 508, the electronic device 101 may determine whether a preset time has elapsed after the output of the message in operation 503. If user input for selecting the storage medium card or the SIM card has not been received within the preset time after the output of the message, the electronic device 101 may perform at least part of initialization of the communication circuit and may deactivate at least part of the communication circuit as in operation 507. Furthermore, although not illustrated, the electronic device 101 may further deactivate at least part of the communication circuit as in operation 505, if user input responsive to the output message (503) is not received within the preset time after the output of the message (508).

In operation 509, the electronic device 101 may determine whether the tray is re-inserted into the socket of the electronic device within a preset time from the separation. The electronic device 101 may perform initialization of the communication circuit when the tray is not re-inserted into the socket within the preset time.

In operation 510, the electronic device 101 may determine whether a particular SIM card inserted into the re-inserted tray when the tray is re-inserted into the socket within the preset time. The electronic device 101 may perform initialization of the communication circuit when an absence of any SIM card in the re-inserted tray is detected.

In operation 511, when the particular SIM card is inserted into the re-inserted tray, the electronic device 101 may determine whether the particular SIM card matches the first SIM card inserted into the tray before the removal of the tray is detected.

In operation 512, the electronic device 101 may reactivate the deactivated communication circuit when it is determined in operation 516 that the particular SIM card matches the first SIM card.

For example, the electronic device 101 may determine whether the re-inserted tray has a storage medium card disposed therein, when it is determined that the particular SIM card matches the first SIM card. When the storage medium card is inserted into the re-inserted tray, the electronic device 101 may store information regarding the state in which the storage medium card is received in the re-inserted tray, in order to enable a function corresponding to the storage medium card to be used. For example, the electronic device 101 may recognize the mounting of the storage medium card according to stored information, and may then allow or facilitate a function corresponding to the storage medium card to be performed.

For example, when there is no storage medium card in the re-inserted tray, the electronic device 101 may store information indicating this state in which the tray has no storage medium card disposed therein. A storage medium card serves to provide additional storage space to the electronic device 101. Therefore, even if there is no storage medium card in the tray, the absence of a storage medium card has no influence on executing communications through the communication circuit (unlike the SIM card). Accordingly, the electronic device 101 may activate the communication circuit without initializing the communication circuit, even if there is no storage medium card received in the tray.

For example, when it is determined that the particular SIM card fails to match the first SIM card, the electronic device 101 may activate and initialize the communication circuit so as to utilize the user information provided by the substituted SIM card.

Figure 5B:
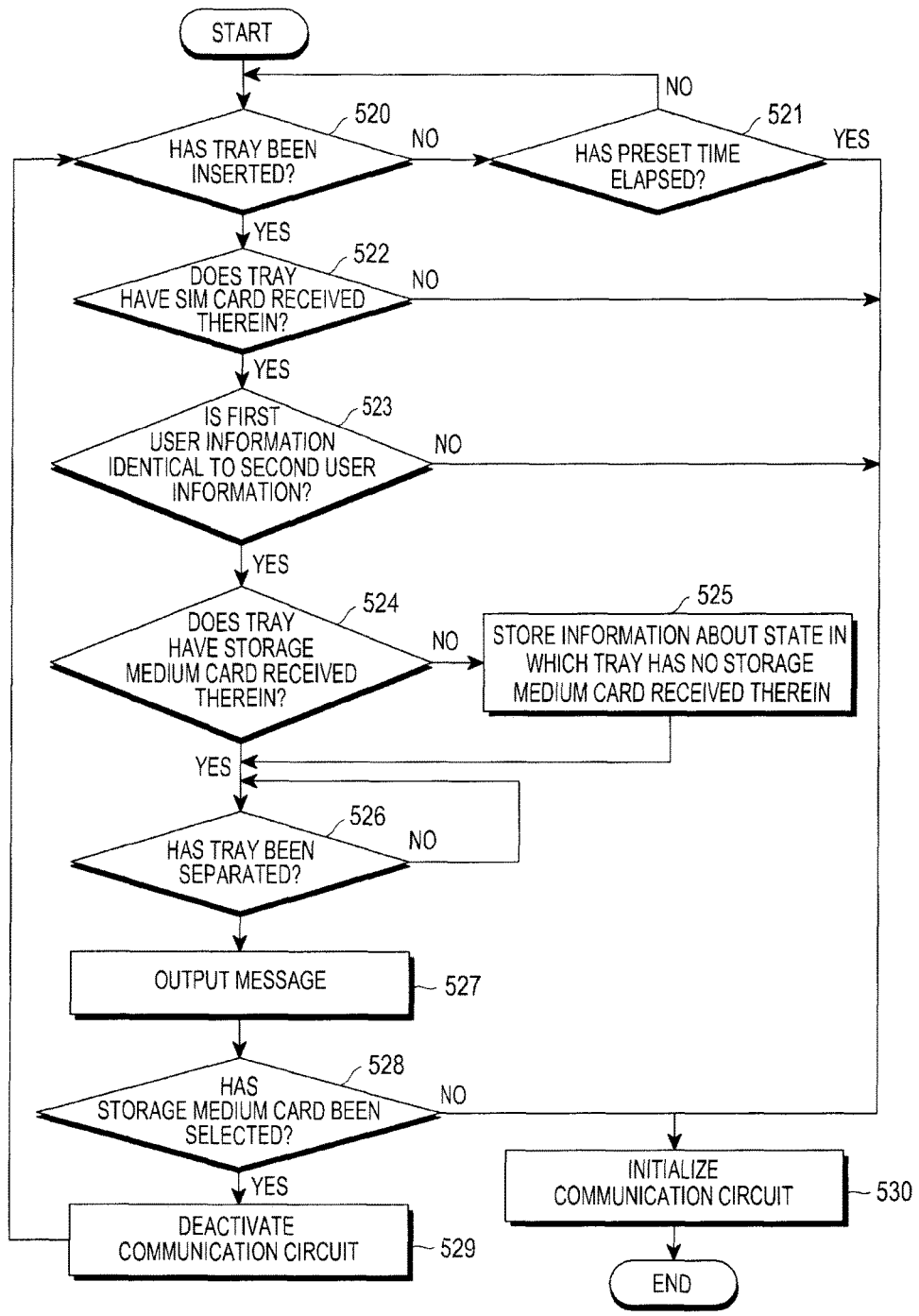

FIG. 5B is a flowchart illustrating an operating method of an electronic device according to various embodiments of the present disclosure.

In operation 520, the electronic device 101 may determine whether the tray has been inserted. If the tray was not inserted, then in operation 521, the electronic device 101 may determine whether a preset time has elapsed in which the tray has not been inserted. In such a case, the electronic device 101 may initialize a communication circuit thereof in the case where the preset time has elapsed, as seen in operation 530. The preset time may be designated according to the policy of a service provider for a communications network to which the electronic device 101 is connected or otherwise coupled in order to perform communications through the communication circuit.

If the tray was inserted, then in operation 522, the electronic device 101 may determine whether the tray has a particular SIM card disposed therein. The electronic device 101 may initialize the communication circuit in the case where there is no SIM card in the tray, as in operation 530.

In operation 523, when the particular SIM card is disposed within the tray, then the electronic device 101 may compare a first user information of the electronic device 101 and second user information of the particular SIM card. The electronic device 101 may execute this comparison in order to determine whether or not the particular SIM card matches the first SIM card inserted into the tray before the removal of the tray is detected. When the first user information is different from the second user information, the electronic device 101 may detected that the particular SIM card is different from the first SIM card, and may therefore initialize the communication circuit using the particular SIM card and second user information, as in operation 530.

If the first user information matches the second user information, then in operation 524, the electronic device 101 may detect that the particular SIM card is same as the first SIM card and may subsequently determine whether the tray has a storage medium card received therein.

When the storage medium card is inserted into the tray, the electronic device 101 may store information indicating this state in which the storage medium card has is inserted, in order to enable executable functions relating to the storage medium card. For example, the electronic device 101 may detect the insertion of the storage medium card according to stored information and may then allow functions relating to the storage medium card to be performed or otherwise executed.

When the tray lacks a storage medium card, then in operation 525, the electronic device 101 may store information indicating a state in which the tray has no storage medium card received therein. A storage medium card serves to provide additional storage space to the electronic device 101. Therefore, even if there is no storage medium card received in the tray, the lack of the storage medium card has no influence on facilitating communications through the communication circuit (unlike the SIM card), and thus the communication circuit may not be reinitialized (contrary to the operation in which a SIM card is replaced). Furthermore, it is noted in some embodiments, operation 525 may be omitted.

In operation 526, the electronic device 101 may detect whether the tray has been separated, removed or otherwise ejected from the device. In operation 527, the electronic device 101 may output a message requesting selection of one of the SIM card option or the storage medium card option when the separation of the tray is detected. The message may be displayed in the form of a popup window on the display 160, as illustrated in FIG. 6A, or may be output in a voice through a speaker, as illustrated in FIG. 6B. When the separation of the tray is detected, the electronic device 101 may output the message in order to prompt a user to select one of the SIM card option or the storage medium card option are intended to be replaced or received. For example, the selection of one of the SIM card option or the storage medium card option is performed by a touch input or a voice input received from the user.

In operation 528, the electronic device 101 may determine whether the storage medium card option or the SIM card option is selected according to a received user input. Subsequently, in operation 530, the electronic device 101 may perform initialization of the communication circuit if the SIM card option is selected, in order to utilize the new user information provided by the replaced SIM card.

When the storage medium card option is selected, then in operation 529, the electronic device 101 may deactivate at least part of the communication circuit that performs communication using the user information stored in the SIM card. For example, when the user wants to replace or insert the storage medium card, rather than the SIM card, the electronic device 101 does not perform initialization of the communication circuit of the electronic device 101. For example, in the situation in which the electronic device 101 fails to recognize the SIM card on account of separation of the tray, the electronic device 101 may deactivate at least part of the communication circuit, thereby preventing communications from being performed using the user information stored in the SIM card.

After deactivating the communication circuit, the electronic device 101 may return to operation 520 to detect whether the tray is inserted, and may perform the subsequently following operations.

In various embodiments of the invention, outputting the message in order to query the user's intention when the electronic device 101 detects separation of the tray has been described above with reference to FIG. 5B, but it should be understood the present disclosure is not limited thereto. For example, the user may preconfigure the device such that the communication circuit of the electronic device 101 does not perform initialization of the communication circuit until the device detects a separate user input when the tray is separated. For example, when the separation of the tray is detected, the electronic device 101 may not output any such message, and rely on a default configuration instead. In various embodiments, the electronic device 101 may function according to user's intent based on a user's initial setting or default pre-configuration, without manual user input of a present intent.

In various embodiments, the electronic device 101 may detect whether the SIM card has been replaced by comparing the first user information stored in a memory of the electronic device 101 and the second user information stored in the SIM card. The comparison may be executed when the separated tray is inserted again, and the electronic device 101 may in some embodiments reboot when it is determined that the SIM card has been replaced.

As described above, the electronic device 101 according to various embodiments of the present disclosure may determine whether the user wants to replace the SIM card or the storage medium card that can be inserted into the tray, and may operate depending on the identified user's intention.

Figure 7:
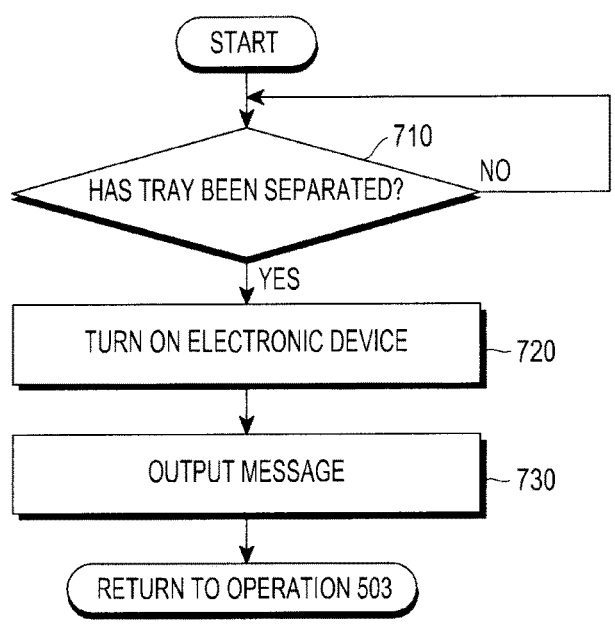
FIG. 7 is a flowchart illustrating a method in which an electronic device according to various embodiments of the present disclosure operates in a turned-off state.

FIG. 7 is a flowchart illustrating a method in which an electronic device according to various embodiments of the present disclosure operates in a partially deactivated or 'turned-off' state.

FIG. 7 illustrates the operation of the electronic device 101 when separation of the tray is detected while the electronic device 101 is deactivated or turned-off.

In operation 710, the deactivated or turned-off electronic device 101 may detect whether the tray has been separated. For example, even in the deactivated or turned-off state, the electronic device 101 may detect whether the tray is separated, through a mechanical element (for example, a pin, a switch, etc.) that is connected with or brought into contact with the tray when the tray is inserted.

In operation 720, the electronic device 101 may be activated or turned-on when the separation of the tray is detected. For example, the electronic device 101 may be preconfigured to change from a deactivated state into an activated state or to be turned-on when the separation of the tray is detected. Accordingly, when the separation of the tray is detected, the electronic device 101 may be turned on even if there is no separate user input for turning on the electronic device 101.

In operation 730, the electronic device 101 may output a message for selecting one of a SIM card option or a storage medium card option, after the electronic device 101 is turned on.

When a storage medium card is inserted while the SIM card is unchanged, the electronic device 101 may not perform a particular operation, such as performing user authentication with user information of a SIM card received in the tray thereof. Accordingly, the electronic device 101 may be activated or turned-on in order to output the message querying selection of the SIM card option or the storage medium card option.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations.

At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction.

The control unit 110 or processor 111 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. In addition, an artisan understands and appreciates that a "processor" or "microprocessor" may be hardware in the claimed disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA.

As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The control unit may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc.

The control unit or processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, or a combination hardware configured with machine executable code and may be performed in whole or in part within the programmed instructions of a computer. No claim element herein is to be construed under the provisions of 35 U.S.C. 112, sixth paragraph, unless the element is expressly recited using the phrase "means for".

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se.

In addition, an artisan understands and appreciates that a "processor" or "microprocessor" constitute hardware in the claimed invention. Under the broadest reasonable interpretation, the appended claims constitute statutory subject matter in compliance with 35 U.S.C. § 101.

The functions and process steps herein may be performed automatically or wholly or partially in response to user command. An activity (including a step) performed automatically is performed in response to executable instruction or device operation without user direct initiation of the activity.

The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code which is made by a compiler or a code which may be executed by an interpreter. The programming module according to the present disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

According to various embodiments, provided is a storage medium that stores instructions set to allow at least one processor to perform at least one operation when executed by the at least one processor, wherein the at least one operation may include: an operation of operating a communication circuit of the electronic device while a tray of the electronic device that has a first SIM card received therein is inserted in a socket of the electronic device; an operation of detecting whether the tray having the first SIM card received therein is separated from the socket; an operation of deactivating at least part of the communication circuit if the tray having the first SIM card received therein is separated from the socket; an operation of detecting whether the tray is inserted into the socket again; an operation of detecting whether the first SIM card or a second SIM card different from the first SIM card is present in the re-inserted tray, if the tray is re-inserted; and an operation of determining whether to initialize the communication circuit based at least partially on the result obtained by detecting whether the first SIM card or the second SIM card is present in the re-inserted tray.

Various embodiments disclosed herein are provided merely to easily describe technical details of the present disclosure and to help the understanding of the present disclosure, and are not intended to limit the present disclosure. Accordingly, the present disclosure should be construed as including all modifications or various other embodiments based on the technical idea of the present disclosure.

What is claimed is:
1. An electronic device comprising:
a housing;
a socket disposed in the housing;
a tray insertable into the socket, and into which at least one of a storage medium card and a subscriber identity module (SIM) card is insertable;
a communication circuit disposed in the housing;
a processor disposed in the housing and electrically coupled to the communication circuit; and
a memory electrically coupled to the processor, the memory storing instructions executable by the processor to cause the processor to:
perform a communication through the communication circuit by using a first SIM card inserted in the tray, while the tray is inserted into the socket;
detect whether the tray is removed from the socket;
in response to the detection that the tray is removed from the socket, control to display a message for receiving a user input for selecting one of the storage medium card or the first SIM card to be replaced from the tray;
in response to the reception of the user input for selecting the first SIM card, perform a first initialization of the communication circuit and a deactivation of at least part of the communication circuit;
in response to the deactivation of the at least part of the communication circuit, detect whether the tray is re-inserted into the socket within a preset period of time after the deactivation of the at least part of the communication circuit;
in response to the detection that the tray is re-inserted into the socket, detect whether a particular SIM card inserted into the re-inserted tray matches the first SIM card; and
in response to the detection that the particular SIM card fails to match the first SIM card, perform a second initialization of the communication circuit based on user information of the particular SIM card.

2. The electronic device of claim 1, wherein the instructions are further executable to cause the processor to:
disallow to perform the second initialization of the communication circuit in response to the detection that the particular SIM card matches the first SIM card.

3. The electronic device of claim 1, wherein the instructions are further executable to cause the processor to:
in response to the detection that the tray is re-inserted into the socket, when any SIM card is absent from the re-inserted tray, perform the second initialization of the communication circuit.

4. The electronic device of claim 1, wherein the instructions are further executable to cause the processor to:
store user information of the first SIM card before the tray is removed, and retrieve the user information of the particular SIM card after the tray is re-inserted,
wherein detecting whether the particular SIM card inserted in the re-inserted tray matches the first SIM card comprises comparing the stored user information of the first SIM card with the retrieved user information of the particular SIM card.

5. The electronic device of claim 4, wherein the stored user information and the retrieved user information respectively comprise at least one of a mobile country code (MCC), a mobile network code (MNC), and a group identifier (GID).

6. The electronic device of claim 1, wherein the communication circuit comprises a cellular communication circuit performing network communication utilizing user information of the first SIM card.

7. The electronic device of claim 1, wherein the instructions are further executable to cause the processor to:
in response to the reception of the user input for selecting the storage medium card, perform the deactivation of the at least part of the communication circuit.

8. The electronic device of claim 1, wherein the electronic device is turned-on and the message is output, in response to the detection that the tray is removed from the socket while the electronic device is in a turned-off state.

9. The electronic device of claim 1, wherein the instructions are further executable to cause the processor to:
in response to the detection that the tray is not re-inserted into the socket within the preset period of time after the deactivation of the at least part of the communication circuit, perform the second initialization of the communication circuit.

10. A method in an electronic device, comprising:
performing a communication through a communication circuit of the electronic device by using a first SIM card inserted into a tray, while the tray is inserted into a socket of the electronic device;
detecting whether the tray is removed from the socket;
in response to the detection that the tray is removed from the socket, displaying a message for receiving a user input for selecting one of a storage medium card or the first SIM card to be replaced from the tray;
in response to the reception of the user input for selecting the first SIM card, performing a first initialization of the communication circuit and a deactivation of at least part of the communication circuit;
in response to the deactivation of the at least part of the communication circuit, detecting whether the tray is re-inserted into the socket within a preset period of time after the deactivation of the at least part of the communication circuit;

in response to the detection that the tray is re-inserted into the socket, detecting, by a processor of the electronic device, whether a particular SIM card inserted into the re-inserted tray matches the first SIM card; and in response to the detection that the particular SIM card fails to match the first SIM card, performing a second initialization of the communication circuit based on user information of the particular SIM card.

11. The method of claim 10, further comprising:

in response to the detection that the particular SIM card matches the first SIM card, disallowing to perform the second initialization of the communication circuit.

12. The method of claim 10, further comprising:

in response to the detection that the tray is re-inserted into the socket, when any SIM card is absent from the re-inserted tray, performing the second initialization of the communication circuit.

13. The method of claim 10, wherein the detecting whether the particular SIM card inserted into the re-inserted tray matches the first SIM card comprises:

storing user information of the first SIM card before the tray is removed, and retrieving the user information of the particular SIM card when the tray is re-inserted; and comparing the stored user information of the first SIM card with the retrieved user information of the particular SIM card.

14. The method of claim 10, further comprising:

in response to the reception of the user input for selecting the storage medium card, performing the deactivation of the at least part of the communication circuit.

* * * * *